(12) United States Patent
Patel et al.

(10) Patent No.: US 12,028,679 B2
(45) Date of Patent: Jul. 2, 2024

(54) ELECTROSTATIC CLUTCH

(71) Applicant: AAC ACOUSTIC TECHNOLOGIES (SHENZHEN) CO., LTD., Shenzhen (CN)

(72) Inventors: Anup Patel, EB (GB); Euan James Boyd, EB (GB); Yannick Pierre Kervran, HK (FR)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 178 days.

(21) Appl. No.: 17/852,255

(22) Filed: Jun. 28, 2022

(65) Prior Publication Data
US 2023/0421968 A1 Dec. 28, 2023

(51) Int. Cl.
*H04R 19/04* (2006.01)
*H04N 13/00* (2018.01)

(52) U.S. Cl.
CPC ............. *H04R 19/04* (2013.01); *H04N 13/00* (2013.01); *H04R 2201/003* (2013.01)

(58) Field of Classification Search
CPC .................. H04R 19/04; H04R 2201/003
See application file for complete search history.

(56) References Cited

U.S. PATENT DOCUMENTS

2022/0194780 A1* 6/2022 Loeppert ............... B81B 3/0086

* cited by examiner

*Primary Examiner* — Andrew L Sniezek
(74) *Attorney, Agent, or Firm* — W&G Law Group

(57) ABSTRACT

Provided is an electrostatic clutch. The electrostatic clutch includes: multiple arrays of HIN electrodes, a respective pass-through channel being formed between any two arrays of the multiple arrays of HIN electrodes; and multiple arrays of biased electrodes, each array of the multiple arrays of biased electrodes moving back and forth in the respective pass-through channel such that electrostatic force is generated between the multiple arrays of biased electrodes and the multiple arrays of HIN electrodes. Such configuration allows microphone performance over a wide range of atmospheric pressures which is likely expected by applications. This is achieved electrostatically in a purely passive way having advantages over other designs which require complex electronics and active control. Physically decoupling the membrane and sense structure simplifies design of the sense structure as only small AC perturbations of the rotor is considered with no DC changes in rotor position.

8 Claims, 10 Drawing Sheets

ELECTROSTATIC CLUTCH

TECHNICAL FIELD

The present invention relates to the technical field of microphones, and particularly, to an electrostatic clutch.

BACKGROUND

All commercial MEMS microphones currently have a back volume behind the membrane. This is a semi-sealed volume of air that undergoes compression and expansion when there is an input acoustic wave. For a defined package size, this back volume is necessary to allow the membrane to move under external pressure wave. However, this back volume is currently the largest source of acoustic noise and hence biggest limiter for acoustic SNR in microphones. The smaller the back volume, the higher the acoustic noise from it. It is therefore impossible to realize a high SNR microphone above approximately 74 dB SNR unless the package size is made very large. If the back volume is replaced by a vacuum and the sensing part of the MEMS is included inside the vacuum, not only is the back volume noise effectively eliminated, but also damping noise related to membrane movement (e.g. back plate noise). The only way of achieving very high SNR in a normal or smaller sized package is to make the back volume a vacuum.

There are two significant challenges with such a type of vacuum back volume microphone: 1) the pressure difference of 1 atm between air and vacuum would collapse a normal membrane, therefore, a very stiff membrane is needed, and this causes very low sensitivity; 2) ambient pressure changes significantly resulting in a changeable DC offset of the membrane displacement, and conventional rotor-stator designs would not work.

Meanwhile, existing microphones require a back volume which is the biggest source of acoustic noise for a state of the art commercially available microphones. This limits SNR unless very large package sizes are used which is not feasible for mobile applications. It is not possible to achieve a very high microphone SNR, such as 80 dB, in a conventional package size unless a vacuum back volume is used.

The use of a vacuum or low pressure cavity hermetically sealed by a membrane which faces atmosphere, creates a fundamental measurement challenge. Atmospheric pressure varies depending on the environment the user and device are in by an order of 100 kPa. On top of this slow DC change in pressure, the device needs to measure an audio pressure signal of an order of 1 Pa.

One solution to this measurement challenge which concerns the present invention, is to have a coupling between the atmosphere facing membrane and the rotor part of the sensing structure which is 'on' for AC audio signals and 'off' for low frequency or DC changes in atmospheric pressure. This clutch type coupling behavior can be realized through a frequency dependent electrostatic force. The electrostatic clutch in the present invention is designed to achieve a coupling force between the rotor and stator for AC sound pressure signals but not couple any force for slow 'DC' changes in atmospheric pressure which typically change the center deformation of the atmosphere facing membrane over a range of microns. For a DC pressure range, there should be zero or minimal stiffness between the rotor and stator, whilst the stiffness should be significant for AC audio pressures.

SUMMARY

A purpose of the present invention is to provide an electrostatic clutch, aiming to solve the technical problems in the related art. The clutch includes two mechanical components between which an electrostatic force coupling exists such that movement of either component results in a force on the other component.

An embodiment of the present invention provides an electrostatic clutch, including: multiple arrays of high impedance nodes (HIN) electrodes defined as a first component of the clutch. A respective pass-through channel is formed between any two arrays of the multiple arrays of HIN electrodes; and multiple arrays of biased electrodes defined as a second component of the clutch. Each array of the multiple arrays of biased electrodes moves back and forth in the respective pass-through channel, such that electrostatic force is generated between the multiple arrays of biased electrodes and the multiple arrays of HIN electrodes.

As an improvement, each array of the multiple arrays of HIN electrodes includes a plurality of HIN electrodes and a grounded part, an insulating silicon oxide layer is provided between adjacent HIN electrodes of the plurality of HIN electrodes, and the grounded part is electrically connected to the plurality of HIN electrodes and to ground.

As an improvement, each of the plurality of HIN electrodes includes a first conductive polysilicon layer, a resistive bridge layer, and a second conductive polysilicon layer; the first conductive polysilicon layer is electrically connected to the second conductive polysilicon layer through the resistive bridge; and the grounded part is electrically connected to the second conductive polysilicon layer of each of the plurality of HIN electrodes and to ground. The electrostatic force between the array of biased electrodes and the array on HIN electrodes has a frequency dependence similar to a high pass filter where the low frequency cut-off is determined by the resistance of the resistive bridge layers.

As an improvement, within each array of biased electrodes two adjacent biased electrodes of the plurality of biased electrodes have opposite polarities and are connected by an insulating mechanical support.

As an improvement, each array of biased electrodes further includes two grounded shielding electrodes, which are arranged at two ends of each array of the multiple arrays of biased electrodes with the purpose of decreasing stray field from the biased electrodes and increasing force between the two clutch components.

As an improvement, the multiple arrays of HIN electrodes are formed by a tuned resistance material and a polysilicon conductive material.

As an improvement, the HIN electrodes are formed by a monolithic block of tuned resistance material without any insulating spacers; and the tuned resistance material is connected directly to a grounded conductive material without resistive bridges.

Compared with the related art, the present invention has the advantage of allowing microphone performance over a wide range of atmospheric pressures which is likely demanded by applications. This is achieved electrostatically in a purely passive way which has an advantage over other designs which require complex electronics and active control. Physically decoupling the membrane and sense structure simplifies the design of the sense structure as only small AC perturbations of the sense rotor need to be considered with no DC changes in rotor position.

REFERENCE NUMERALS

Figure 1:
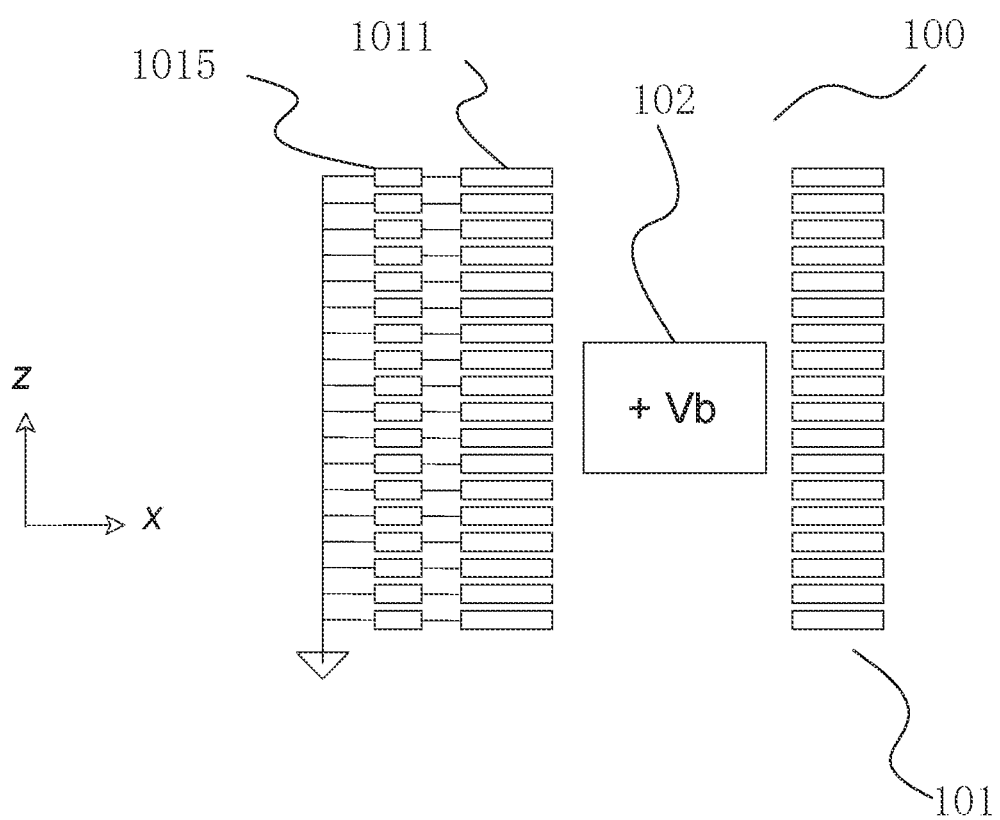
FIG. 1 is a schematic structural diagram of an electrostatic clutch consisting of a stator array of grounded HIN electrodes and a single biased rotor electrode.

100—electrostatic clutch;
101—an array of high impedance nodes electrodes;
1011—high impedance nodes electrode (HIN electrode);
1012—grounded part;
1013—insulating silicon oxide layer;
1014—first conductive polysilicon layer;
1015—resistive bridge layer;
1016—second conductive polysilicon layer;
1017—tuned resistance material;
1018—polysilicon conductive material;
102—an array of biased electrodes;
1021—biased electrodes;
1022—Insulating mechanical support;
1023—grounded shielding electrode;
103—first connecting part;
104—second connecting part;
105—third connecting part;
106—fourth connecting part;
107—fifth connecting part;
108—first suspension beam;
109—first suspension plate;
110—sixth connecting part;
111—second suspension beam;
112—second suspension plate;
113—seventh connecting part;
114—third suspension beam;
115—third suspension plate;
116—accommodation cavity;
200—MEMS condenser microphone;
201—base plate;
202—spacer;
203—membrane;
204—vacuum cavity;
205—connecting rod;
300—capacitive sensing structure;
301—first lever;
302—first supporting part;
303—first sensing moving electrode;
304—first sensing static electrode;
305—second lever;
306—second supporting part;
307—bending slit;
308—second sensing moving electrode;
309—second sensing static electrode;
310—third sensing static electrode;
3101—first portion;
3102—second portion;
311—fourth sensing moving electrode;
312—fourth sensing static electrode;
313—fifth sensing moving electrode; and
314—fifth sensing static electrode.

DESCRIPTION OF EMBODIMENTS

The following embodiments described herein with reference to the accompanying drawings are merely some examples, which are intended to better illustrate the present invention rather than make any limitation on the present invention.

In order to better illustrate the embodiments of the present invention, a three-dimensional coordinate system is made, where an XY plane refers to a plane parallel to a silicon die surface of a deposited MEMS layer, and a Z axis refers to an axis perpendicular to the XY plane.

As shown in FIGS. 1 to 5, an embodiment of the present invention provides an electrostatic clutch 100, which is configured to achieve a coupling force between the rotor and stator for AC sound pressure signals but not couple any force for slow 'DC' changes in atmospheric pressure which typically change the center deformation of the atmosphere facing membrane 203 over a range of microns. For a DC pressure range, there should be zero or minimal stiffness between the rotor and stator.

The electrostatic clutch 100 includes: at least two arrays 101 of high impedance nodes (HIN) electrodes, and an array 102 of biased electrodes.

The at least two arrays 101 of HIN electrodes are defined as a first component of the electrostatic clutch 100 and usually act as a clutch stator, and a pass-through channel is formed between two arrays 101 of HIN electrodes. In this embodiment, preferably, each array 101 of high impedance nodes electrode includes a plurality of HIN electrodes 1011 and a grounded part 1012. The larger the number of HIN electrodes 1011, the higher the performance. However, for embodiments with z-axis rotor displacement, the number of HIN electrodes 1011 is limited by process constraints. An insulating silicon oxide layer 1013 is provided between two adjacent HIN electrodes 1011, and a grounded part 1012 is electrically connected to ground while the grounded part 1012 is electrically connected to a plurality of HIN electrodes 1011.

The array 102 of biased electrodes are defined as a second component of the electrostatic clutch 100 and usually serves as a clutch rotor. Those skilled in the art should know that, it is also possible that the at least two arrays 101 of HIN electrodes act as a clutch rotor, while the array 102 of biased electrodes acts as a clutch stator, and this is not limited herein. An end of the array 102 of biased electrodes is connected to the membrane 203, and with movement of the membrane 203, another end of the array 102 of biased electrodes can move back and forth in the pass-through channel under an electrostatic force between the array 102 of biased electrodes and the at least two arrays 101 of high impedances electrodes. The electrostatic force obeys a Hooke's law type behavior for small displacements of the rotor resulting from charges drawn into the HIN electrodes from ground, and trapped there due to the resistive bridges.

The electrostatic clutch 100 is effectively "on" for audio band frequencies and "off" for low frequencies. This clutch acts as an RC high pass filter which couples the AC movement of the membrane corresponding to an audio signal but filters the slow movement of the membrane due to slow changes in atmospheric pressure typically over the range 0.5-1 atm which could occur, for example, with changes in weather, altitude or inside a passenger aircraft.

When the array 102 of biased electrodes is not moving or moving at a frequency lower than the cut off frequency, charges flow freely from and onto the surface of the HIN electrodes 1011. This means when the array 102 of biased electrodes move slowly relative to the array 101 of HIN electrodes, at a frequency lower than the cut-off, there is no force coupling or interaction between the clutch stator and rotor. In this case the coupling stiffness or clutch stiffness is approximately zero. However, when the clutch rotor moves at a frequency higher than cut-off, the charges induced in the HINs due to the biased electrodes 1021 are trapped. Typically, the dimensions of each HIN will be much smaller than the biased electrodes resulting is a significant restoring force for AC displacement of the clutch rotor. This corresponds to a significant coupling stiffness. The filter is therefore achieved by frequency dependent electrostatic stiffness between the atmosphere facing membrane 203 and the rotor part of the capacitive sensing structure 300.

Figure 2:
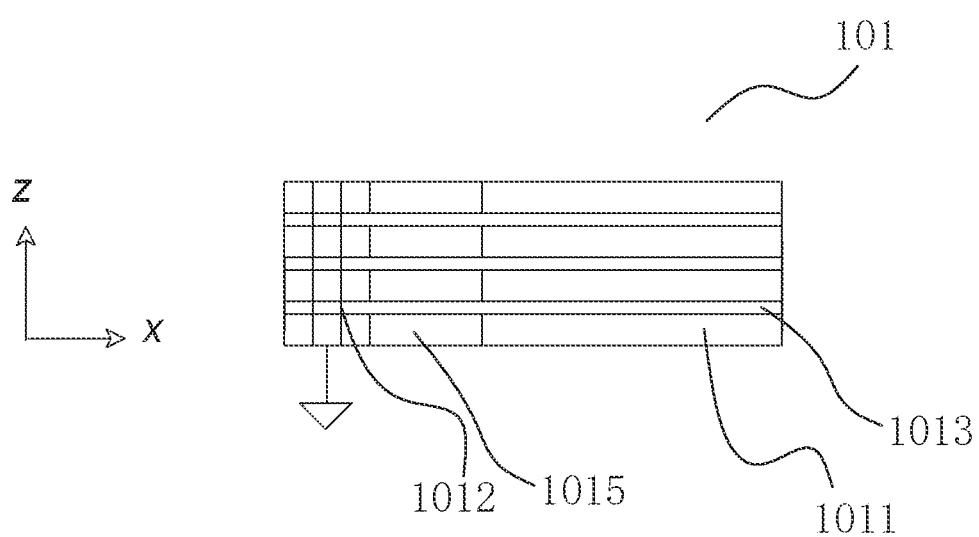
FIG. 2 is illustration of how layers deposited as thin films using standard silicon processes can form an HIN array.
Figure 3:
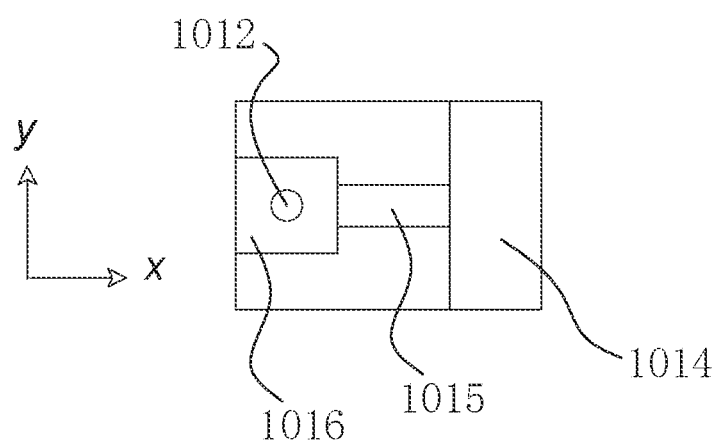
FIG. 3 is a top view of an electrical connection for a layer in an thin film array of high impedance nodes electrodes.

With reference to FIG. 2 and FIG. 3, the high impedance nodes electrode 1011 includes a first conductive polysilicon layer 1014, a resistive bridge layer 1015 and a second conductive polysilicon layer 1016. The first conductive polysilicon layer 1014 is electrically connected to the second polysilicon layer 1016 through the resistive bridge layer 1015, and the grounded part 1012 is electrically connected to the second conductive polysilicon layer 1016 while the grounded part 1012 is electrically connected to ground. The material of the resistive bridge layer 1015 connecting each layer to ground may be doped polysilicon, materials used to create diodes and or a shottky material. The resistivity of this material and the resistive bridge layer 1015 can be used to tune the roll-off frequency which determines the frequency below which the clutch is no longer actuating the sensing part of the transducer. This is because the roll off frequency is expected to be proportional to 1/RC where R is the resistance of the resistive bridge layer 1015 and C is the capacitance between a single HIN element 1011 and the biased electrode it faces.

Figure 7:
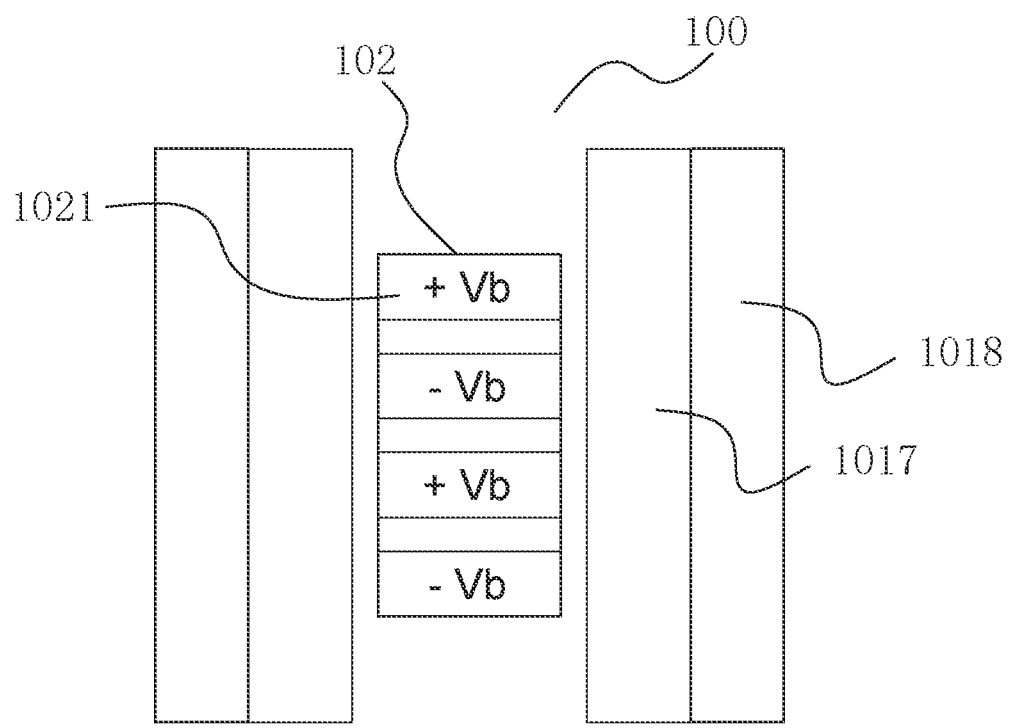
FIG. 7 is a schematic structural diagram of an electrostatic clutch consisting of a stator formed of four blocks of material acting as a single HIN electrode and an array of high impedance nodes electrodes.

As shown in FIG. 7, the array 101 of HIN electrodes can also be formed by a tuned resistance material 1017 and a polysilicon conductive material 1018, and the polysilicon conductive material 1018 is connected to ground, this has the major advantage of avoiding many process layers. Instead of the resistance of individual resistive bridge layer determining roll off frequency, as for the array 101 of HIN electrodes, in this case the resistivity of the tuned resistance material 1017 will determine the frequencies over which charge is locally trapped when the array 102 of biased electrodes moves. The connection to ground for this material can provided by a layer of polysilicon or other conductive material with a resistivity less than that of the tuned resistance material 1017. The polysilicon conductive layer 1018 has an interface with the tuned resistance material 1017 in the z-axis, and has the purpose of achieving zero potential along the z axis length of the tuned resistance material 1017 on the surface not facing the biased electrode(s). Additional advantages of this embodiment include the elimination of insulating layers which have the effect of reducing the clutch z-axis stiffness.

Figure 4:
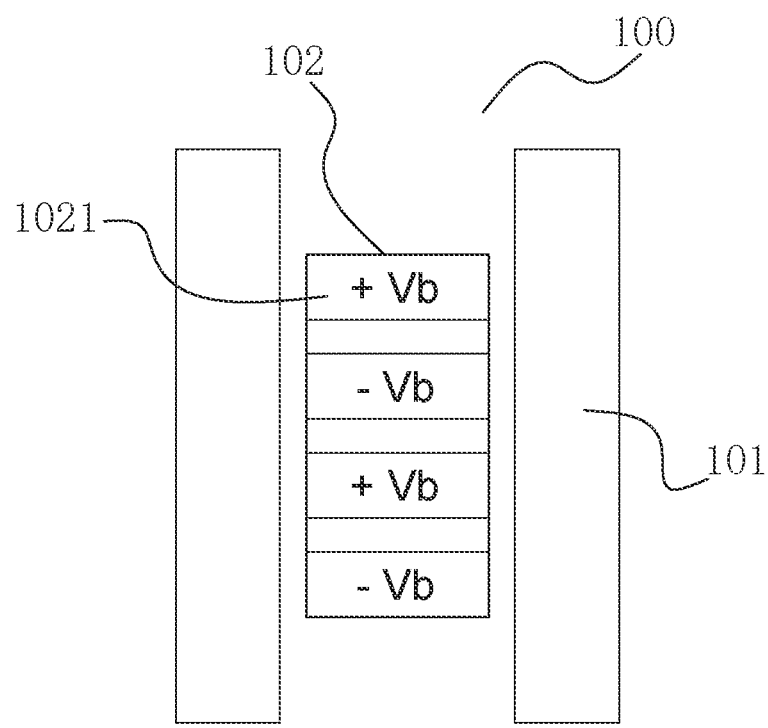
FIG. 4 is an embodiment of the electrostatic clutch in a case that a plurality of biased electrodes are provided with alternating polarity.
Figure 5:
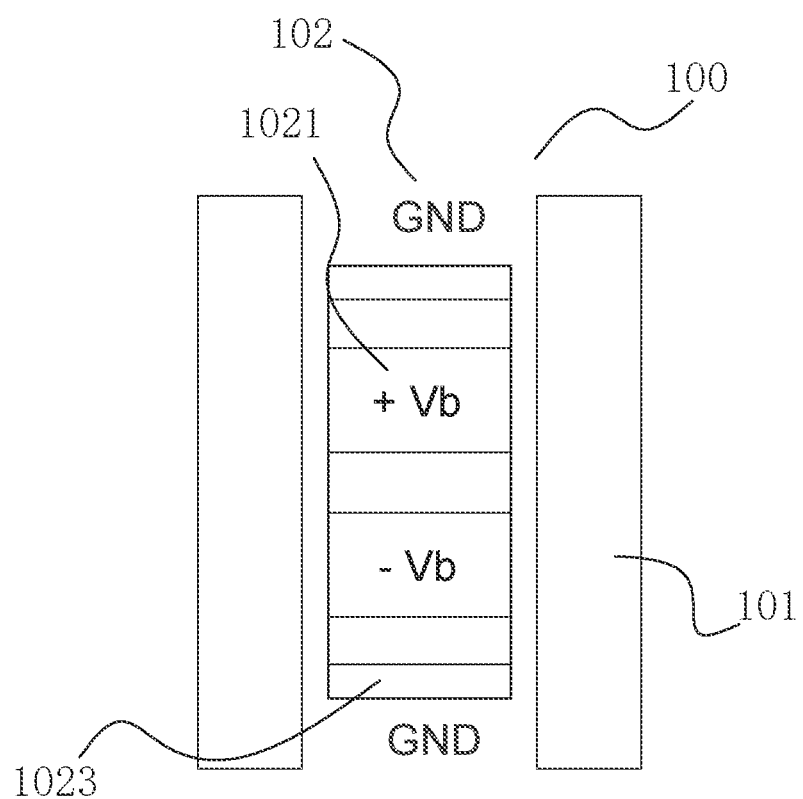
FIG. 5 is an embodiment of the electrostatic clutch in a case that grounded shielding electrodes are provided at the ends of the biased electrode array to enhance stiffness.

As shown in FIG. 4 and FIG. 5, the array 102 of biased electrodes includes a plurality of biased electrodes 1021, and the plurality of biased electrodes 1021 are arranged based on alternate polarities of the plurality of biased electrodes 1021. Two adjacent biased electrodes 1021 have different polarities, and an insulating mechanical support 1022 is provided between two adjacent biased electrodes 1021. The array 102 of biased electrodes further includes grounded shielding electrodes 1023, and a respective grounded shielding electrode 1023 is provided at each of a top and a bottom of the array 102 of biased electrodes. Their purpose is to minimize electric field from the biased electrodes 1021 from leaving the pass-through channel between arrays 101 of HIN electrodes. Stray electric field is the origin of non-zero DC force between the clutch rotor and stator over its range of DC displacement. A non-zero DC force actuates the sensing part of the transducer when there is no audio signal which is not wanted. The grounded shielding electrode 1023 effectively reduce the DC force to almost zero over a large distance range of microns expected for atmospheric pressure changes.

Based on the above-mentioned electrostatic clutch 100, an embodiment of the present invention further provides a MEMS condenser microphone 200, including a base plate 201, a spacer 202 and a membrane 203. The membrane 203 is supported above the base plate 201 by the spacer 202. The base plate 201, the spacer 202, and the membrane 203 encloses a vacuum cavity 204. An end of the membrane 203 close to the vacuum cavity 204 is connected to the electrostatic clutch 100 by a connecting rod 205. The electrostatic clutch 100 connected to a capacitive sensing structure 300.

The base plate 201 may be made of monocrystalline silicon or other materials known to those skilled in the art. The spacer 202 and the membrane 203 that is supported above the base plate 201 by the spacer 202 may be formed by layer-by-layer deposition, patterning, and sacrifice processes. If necessary, an insulating layer may be provided between the spacer 202 and the base plate 201, and this case will not be further described herein.

The vacuum cavity 204, for example, can be sealed by low-pressure plasma-enhanced chemical vapor deposition (PECVD) at 200-350° C. This MEMS process belongs to common knowledge in the technical field, and is therefore not further described herein. The pressure of the vacuum cavity 204 is preferably lower than 1 kPa, so that the viscosity of the residual gas in the vacuum cavity 204 is significantly lower than the viscosity of a standard atmospheric pressure.

Being a vacuum cavity 204, a pressure of which is lower than the atmospheric pressure is formed between the membrane 203 and the base plate 201, the membrane 203 undergoes static deformation under an action of the atmospheric pressure in a case without an acoustic pressure. That is, the membrane 203 undergoes a static deformation towards the base plate 201, charges flow freely from and onto the surface of the HIN electrodes 1011. This means when the array 102 of biased electrodes moves slowly relative to the array 101 of HIN electrodes, at a frequency lower than the cut-off, there is no force coupling or interaction between the clutch stator and clutch rotor, and an electrical signal outputted from the capacitive structure in the capacitive sensing structure 300 does not change. When the membrane deforms at a frequency higher than cut-off, the electrostatic clutch 100 generates an electrostatic coupling force, to drive the capacitive structure to output variable electrical signals.

The present invention provides various structures of a MEMS compact microphone 200, and it can be known that those skilled in the art can obtain more variant embodiments based on the structures of the microphone provided by the embodiments of the present invention, which will not be limited herein.

As shown in FIG. 6A, FIG. 6B, FIG. 6C, FIG. 6D and FIG. 7, which illustrate a first structure of an MEMS compact microphone 200 according to the present invention, the electrostatic clutch 100 and the capacitive sensing structure 300 are disposed in the vacuum cavity 204, and the electrostatic clutch 100 further includes a first connecting part 103 and a second connecting part 104. The first connecting parting part 103 includes an end connected to a connecting rod 205, and another end connected to multiple arrays 102 of biased electrodes, which act as a rotor of the electrostatic clutch 100. The deformation of the membrane 203 will cause the multiple arrays 102 of biased electrodes to move synchronously with deformation of the membrane 203.

Two second connecting parts 104 are provided at two opposite sides of the first connecting part 103. Each of the two second connecting parts 104 includes an end connected to multiple arrays 101 of HIN electrodes, and another end connected to the capacitive sensing structure 300. The multiple arrays 101 of HIN electrodes act as a stator of the electrostatic clutch 100.

The multiple arrays 101 of HIN electrodes and the multiple arrays 102 of biased electrodes are arranged in a comb-like configuration. The multiple arrays 101 of HIN electrodes and the multiple arrays 102 of biased electrodes are separated spatially, and the multiple arrays 101 of HIN electrodes and the multiple arrays 102 of biased electrodes cross each other. Such a structure can achieve a relatively large displacement, reduce acoustic noise, and provide high stiffness.

The capacitive sensing structure 300 includes a first lever 301, a first supporting part 302, a first sensing moving electrode 303, and a first sensing static electrode 304. A rod body of the first lever 301 is pivotally connected to the first supporting part 302 through a hinge. The first lever 301 includes an end connected to the second connecting part 104, and another end connected to the first sensing moving electrode 303. The first sensing static electrode 304 is opposite to the first sensing moving electrode 303, and the first sensing static electrode 304 and the first sensing moving electrode 303 constitute a capacitor structure that can output variable electrical signals.

When the membrane 203 vibrates, the electrostatic clutch 100 is activated to generate an electrostatic force, and the clutch stator displaces due to AC displacement of the clutch rotor, so that an end of the first lever 301 is activated, with the first lever 301 increasing the mechanical sensitivity by amplifying the displacement of the electrostatic clutch 100. The first sensing moving electrode 303 connected to the first lever 301 moves synchronously, thus, a facing area between the first sensing static electrode 304 and the first sensing moving electrode 303 changes, so that the capacitor structure can output variable electrical signals. A working principle of the capacitor structure is known to those skilled in the art.

Figure 6A:
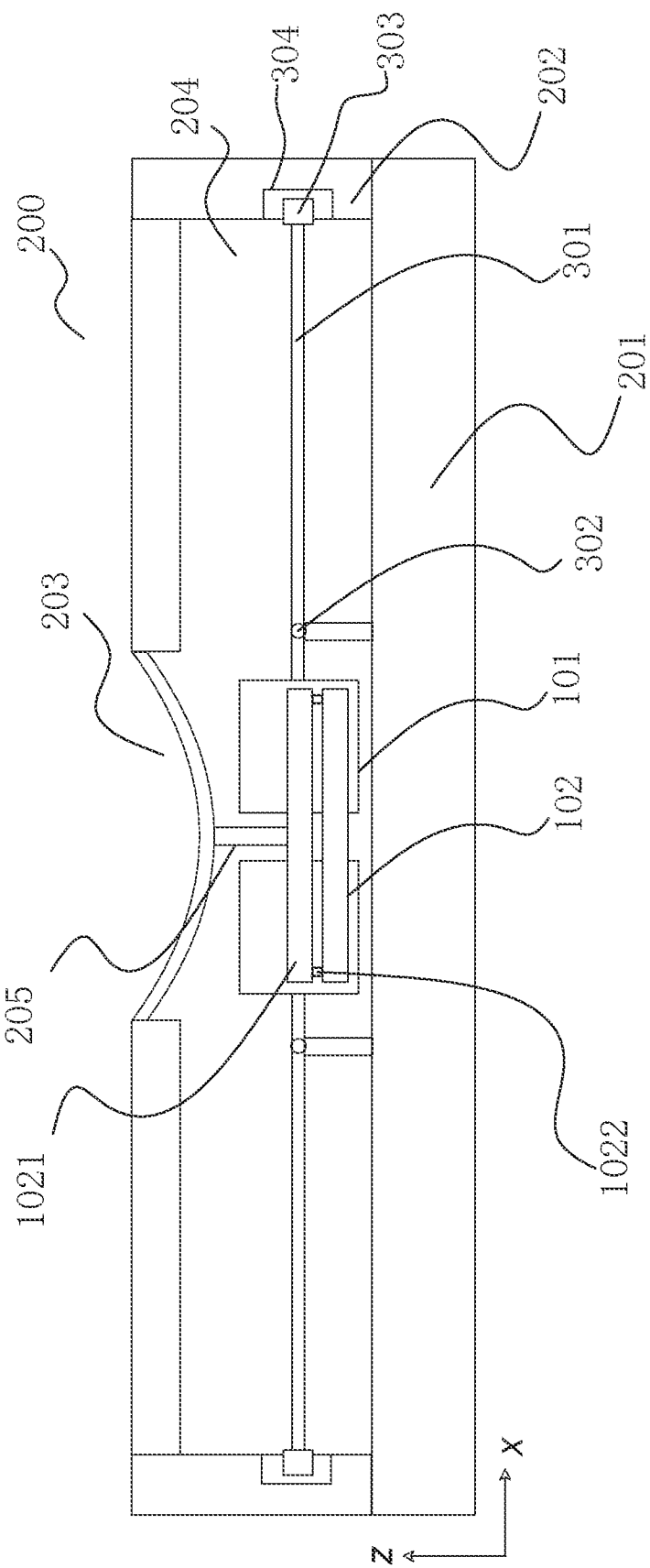
FIGS. 6A, 6B, 6C and 6D are schematic structural diagrams of a first structure of an MEMS condenser microphone according to the present invention, illustrating embodiments of the invention where an electrostatic clutch is part of a hinged cantilever transducer with varying combinations of atmospheric and acoustic pressure.
Figure 6B:
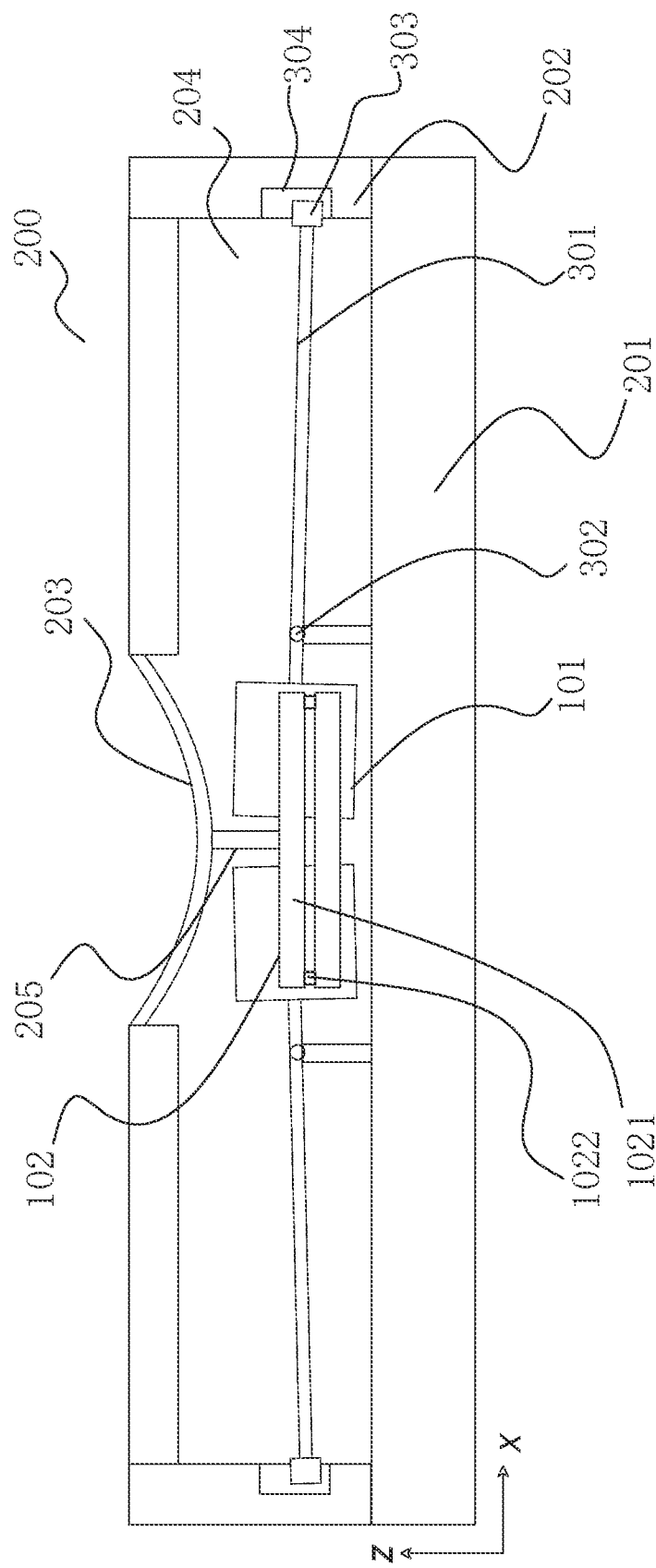
Figure 6C:
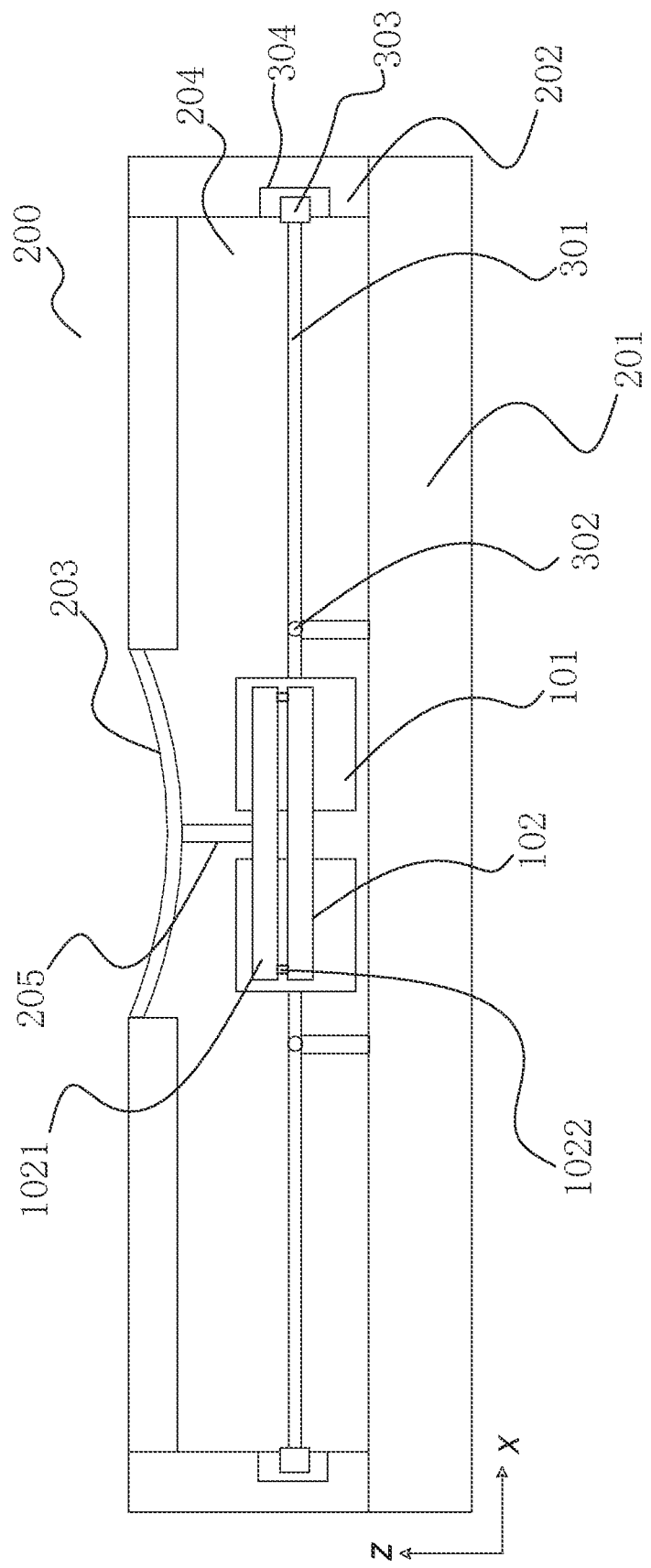
Figure 6D:
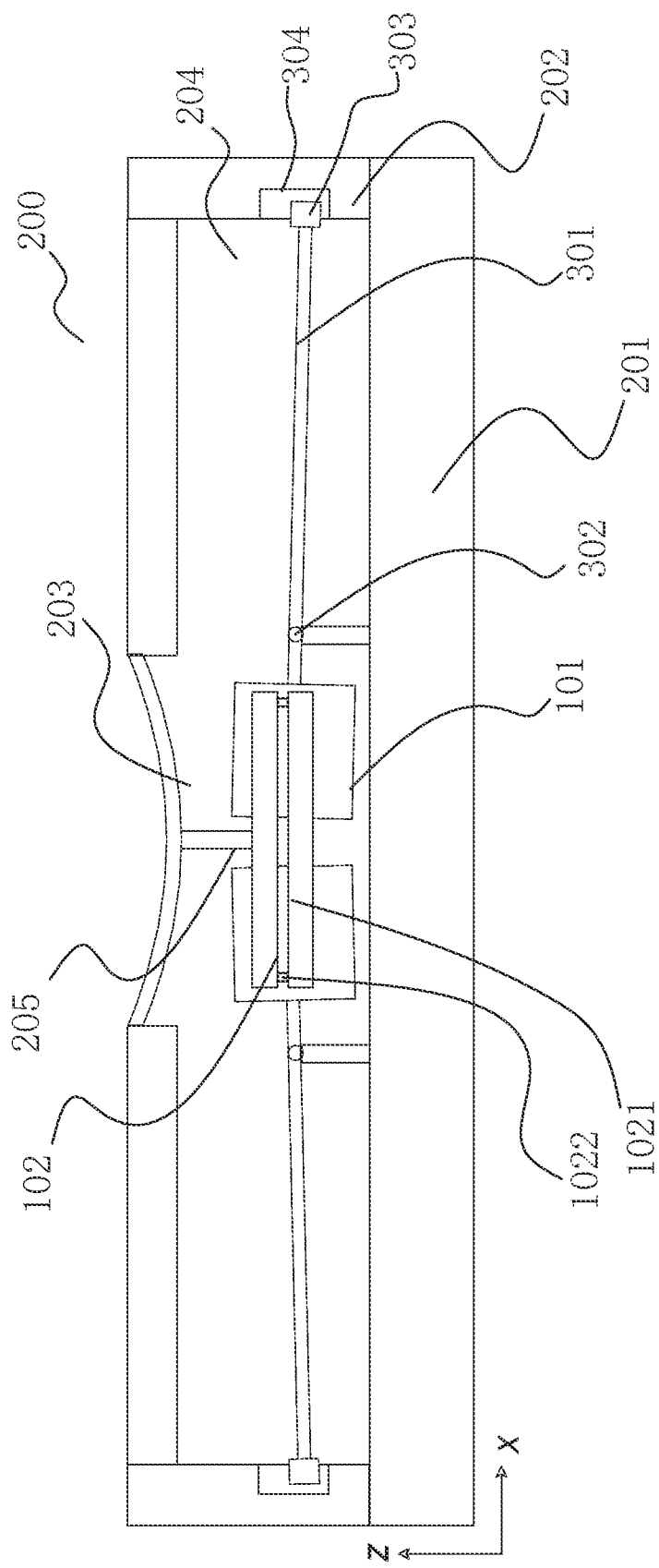

The differences between FIG. 6A, FIG. 6B, FIG. 6C and FIG. 6D illustrate the working principle of the invention. In FIG. 6A, there is a relatively high DC atmospheric pressure and no AC acoustic pressure, leading to a relatively low position of the electrostatic clutch rotor 102 and no displacement of the sensing electrode 303. For an acoustic pressure signal with the same atmospheric pressure as in FIG. 6A, FIG. 6B show the displacements when at the low pressure part of the AC acoustic signal. In this case the electrostatic clutch is active resulting in a displacement of the sense electrode 303 and therefore a signal being generated. FIG. 6C shows the alternative situation with a relatively low DC atmospheric pressure leading to a relatively high position of the electrostatic clutch rotor 102, however because the electrostatic clutch is inactive, the position of the sense electrode 303 is the same as in FIG. 6A. When an AC acoustic pressure is applied the movement of the sense electrode and signal generated is the same as in FIG. 6B. This ability to only measure AC acoustic pressure and not DC atmospheric pressure, allows the sense geometry to be simple and optimized for high sensitivity.

In an embodiment, the HIN electrodes are formed by a monolithic block of tuned resistance material without any insulating spacers; and the tuned resistance material is connected directly to a grounded conductive material without resistive bridges.

The structure, features, and effects of the present invention are described in detail above based on the embodiments shown in the drawings. It should be noted that the above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. An electrostatic clutch, comprising:
   multiple arrays of grounded high impedance node (HIN) electrodes, forming one rigid movable body; and
   multiple arrays of biased electrodes, forming another rigid movable body, such that an electrostatic force is generated between the multiple arrays of biased electrodes and the multiple arrays of HIN electrodes when there is a relative displacement between them; wherein
   a resistive part of an HIN electrode and the capacitance formed between an HIN and neighboring biased electrodes, form a RC circuit with a cutoff frequency which determines the frequency above which the electrostatic clutch transmits a coupling force between the multiple arrays of biased electrodes and the multiple arrays of HIN electrodes and below which the electrostatic coupling force is significantly reduced or negligible.

2. The electrostatic clutch as described in claim 1, wherein a respective pass through channel is formed between two arrays of the multiple arrays of HIN electrodes and multiple arrays of biased electrodes in a comb configuration, wherein each array of the multiple arrays of biased electrodes moves back and forth in the respective pass through channel.

3. The electrostatic clutch as described in claim 1, wherein each array of the multiple arrays of HIN electrodes comprises a plurality of HIN electrodes and a grounded part, an insulating silicon oxide layer is provided between adjacent HIN electrodes of the plurality of HIN electrodes, and the grounded part is electrically connected to the plurality of HIN electrodes and to ground.

4. The electrostatic clutch as described in claim 3, wherein each of the plurality of HIN electrodes comprises a first conductive polysilicon layer, a resistive bridge layer, and a second conductive polysilicon layer; the first conductive polysilicon layer is electrically connected to the second conductive polysilicon layer through the resistive bridge layer; and the grounded part is electrically connected to the second conductive polysilicon layer of each of the plurality of HIN electrodes and to ground; an insulating layer of material or air or vacuum exists between adjacent conducting polysilicon layers.

5. The electrostatic clutch as described in claim 3, wherein each array of biased electrodes further comprises two grounded shielding electrodes, which are arranged at two ends of each array of the multiple arrays of biased electrodes.

6. The electrostatic clutch as described claim 1, wherein within each array of biased electrodes two adjacent biased electrodes of the plurality of biased electrodes have opposite polarities and are connected by an insulating mechanical support.

7. The electrostatic clutch as described in claim 1, wherein the multiple arrays of HIN electrodes are formed by a tuned resistance material electrically connected to a grounded polysilicon conductive material.

8. The electrostatic clutch as described in claim 1, wherein the HIN electrodes are formed by a monolithic block of tuned resistance material without any insulating spacers; and the tuned resistance material is connected directly to a grounded conductive material without resistive bridges.

\* \* \* \* \*